(12) United States Patent
Cook et al.

(10) Patent No.: US 8,493,383 B1
(45) Date of Patent: Jul. 23, 2013

(54) ADAPTIVE DEPTH OF FIELD SAMPLING

(75) Inventors: Robert L. Cook, San Anselmo, CA (US); Loren Carpenter, Nicasio, CA (US)

(73) Assignee: Pixar, Emeryville, CA (US)

( * ) Notice: Subject to any disclaimer, the term of this patent is extended or adjusted under 35 U.S.C. 154(b) by 847 days.

(21) Appl. No.: 12/634,960

(22) Filed: Dec. 10, 2009

(51) Int. Cl.
*G06T 15/00* (2011.01)

(52) U.S. Cl.
USPC ........... 345/419; 345/421; 345/422; 345/423; 345/426; 345/427; 345/581; 345/582; 345/589; 345/622

(58) Field of Classification Search
USPC ................. 345/419, 421, 422, 423, 426, 427, 345/428, 581, 582, 589
See application file for complete search history.

(56) References Cited

U.S. PATENT DOCUMENTS

| | | | |
|---|---|---|---|
| 6,426,755 B1 * | 7/2002 | Deering | 345/581 |
| 6,445,391 B1 * | 9/2002 | Sowizral et al. | 345/421 |
| 6,731,304 B2 * | 5/2004 | Sowizral et al. | 345/622 |
| 7,952,583 B2 * | 5/2011 | Waechter et al. | 345/426 |

OTHER PUBLICATIONS

Lee et al. "Real-Time Depth-of-Field Rendering Using Point Splatting on Per-Pixel Layers". Published 2008.*
Isaksen et al. "Dynamically Reparameterized Light Fields". ACM 2000.*

* cited by examiner

*Primary Examiner* — Kimbinh T Nguyen
(74) *Attorney, Agent, or Firm* — Kilpatrick Townsend & Stockton LLP

(57) ABSTRACT

Adaptive sampling alleviates aliasing by partitioning the field of view of an image sample point into depth regions. Portions of the scene are sampled within a depth region using sample rays. If a sample ray is not completely occluded in the depth region, corresponding sample rays are evaluated in adjacent depth regions. Sample rays can be recursively evaluated in further depth regions until all the subsamples intersect opaque objects or a depth limit or transparency threshold is reached. The value of an image sample point is the weighted combination of sample rays. The number of sample rays in each depth region may increase monotonically with distance along a line of sight from an image sample point for effects such as reflection, refraction, and illumination. The number of sample rays in each depth region may increase monotonically with distance from a focal plane for effects such as depth of field.

32 Claims, 14 Drawing Sheets

ADAPTIVE DEPTH OF FIELD SAMPLING

BACKGROUND OF THE INVENTION

The present invention relates to the field of computer graphics, and in particular to systems and methods for optimizing depth of field effects in computer graphics images. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Many rendering effects are performed by sampling a three-dimensional scene at discrete points. The renderer determines one or more attribute values, such as color, transparency, or depth, for the sample of the three-dimensional scene. The attribute values of one or more samples of the three-dimensional scene are then combined to determine the value of a pixel of the rendered image.

For example, a renderer may trace sample rays into a three-dimensional scene (or project geometry on to an image plane) to render geometry. The intersection of a sampling ray and geometry (or an image sample point in the image plane and the projected geometry) defines a sample of the three-dimensional scene used to determine the value of a pixel of the rendered image. Additionally, illumination, shadowing, scattering, reflection, and refraction effects are created by casting additional sample rays from an intersected portion of scene geometry into further portions of the three-dimensional scene.

In another example, depth of field is a visual effect in which some portions of an image are in focus and other portions of the image are out of focus. Depth of field is the result of the aperture size of a real-world camera and the focal length of its lens system. Typical real-world cameras can only focus on objects within a range of distances, referred to as the depth of field. Objects that are within the camera's depth of field appear in focus, while object in front of or behind the depth of field appear out of focus.

Computer graphics images often mimic depth of field and other physical limitations of conventional optical and photographic equipment to achieve aesthetic effects. One prior approach places a virtual lens and/or virtual camera aperture in front of each image sample, such as a pixel or sub-pixel sample. Each image sample is assigned to a different portion of the aperture. Thus, image sample points view the three-dimensional scene through different portions of the virtual camera aperture. This blurs portions of the scene based on their distance from the focal plane, producing a depth of field effect.

One problem with these sampling-based approaches for generating effects such as illumination, shadowing, reflection, refraction, and depth of field is aliasing of distant objects. The distance between image sample point at a given distance from their origin, such as an intersection point on an object or the virtual camera, determines the image sampling rate or frequency of an object at that distance. Objects close to the origin of the sample rays are sampled by many image sample points and thus are sampled at a high image sampling frequency. As the distance between an object and the origin of the sample rays increases, the distance between image sample points in the scene increases and thus the image sampling frequency decreases. Thus, distant objects are sampled with fewer sample rays than comparable objects closer to the origin. This results in aliasing effects. For example, images of distant objects created using these depth of field effects degrade into a non-descript pixellated blurs, rather than appearing as blurry but recognizable versions of the objects.

A prior solution to aliasing is to increase the number of image sample points used to sample the three-dimensional scene and determine the final attribute values of the pixel. Increasing the number of sample rays ensures that distant objects are sampled more frequently. However, increasing the number of image sample points greatly increases the amount of time and computing resources needed to render the image. For example, doubling the number of image sample points, thereby doubling the spatial sampling frequency at a given depth, will typically double the amount of time required to render the image. Moreover, many of the additional points will sample objects close to the sampling ray origin, and thus are redundant. Additionally, for very distant objects, the number of sample rays required to make the spatial sampling rate high enough to eliminate aliasing may be greater than what is supported by the renderer and the available computing resources.

It is therefore desirable for a system and method to reduce aliasing arising from sampling three-dimensional scene data. It is further desirable that the system and method not substantially increase the time and computing resources required for rendering. It is also desirable for the system and method to operate efficiently and avoid redundant computations.

BRIEF SUMMARY OF THE INVENTION

An embodiment of the invention adaptively samples scenes to alleviate aliasing arising from effects such as reflection, refraction, illumination, and depth of field. In an embodiment, the field of view of an image sample point is partitioned by a number of depth boundaries into a number of depth regions. A renderer samples the portion of the scene within a depth region using one or more sample rays. If an accumulated opacity of a sample ray does not exceed a threshold, the renderer evaluates at least one corresponding sample ray in one or more adjacent depth regions. The renderer then samples the portion of the scene within the adjacent depth region using the corresponding sample rays. Sample rays can be recursively evaluated in further depth regions until all the sample rays intersect opaque objects, a depth limit is reached, or a subsample falls above an opacity threshold or below a transparency threshold. Sample rays are weighted and combined to determine the value of an image sample point.

In an embodiment, the number of sample rays in each depth region may increase monotonically with distance along a line of sight from an image sample point for effects such as reflection, refraction, and illumination. In another embodiment, the number of sample rays in each depth region may increase monotonically with distance from a focal plane for effects such as depth of field.

BRIEF DESCRIPTION OF THE DRAWINGS

The invention will be described with reference to the drawings, in which.

DETAILED DESCRIPTION OF THE INVENTION

Figure 1A:
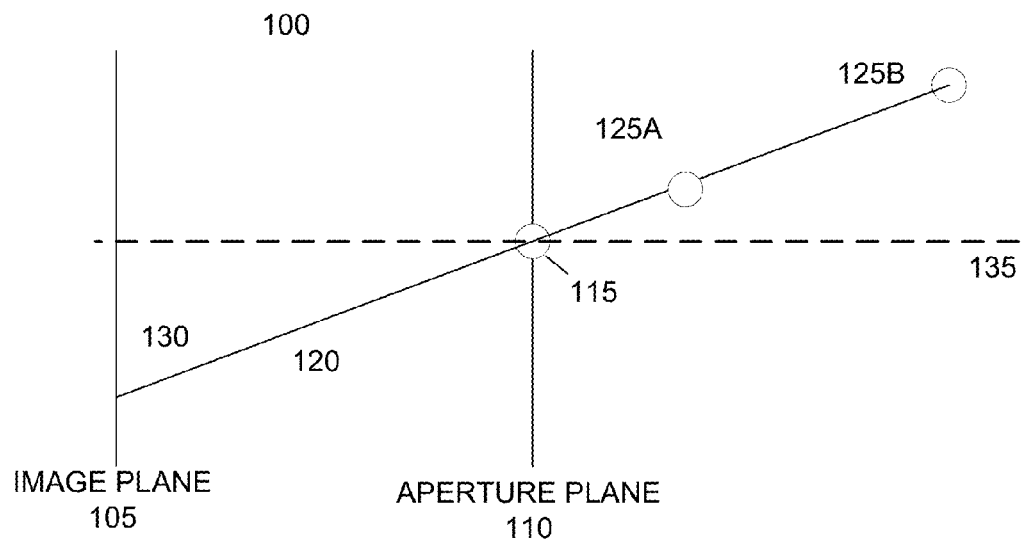
FIGS. 1A and 1B illustrate the cause of depth of field effects in real-world optical systems.
Figure 1B:
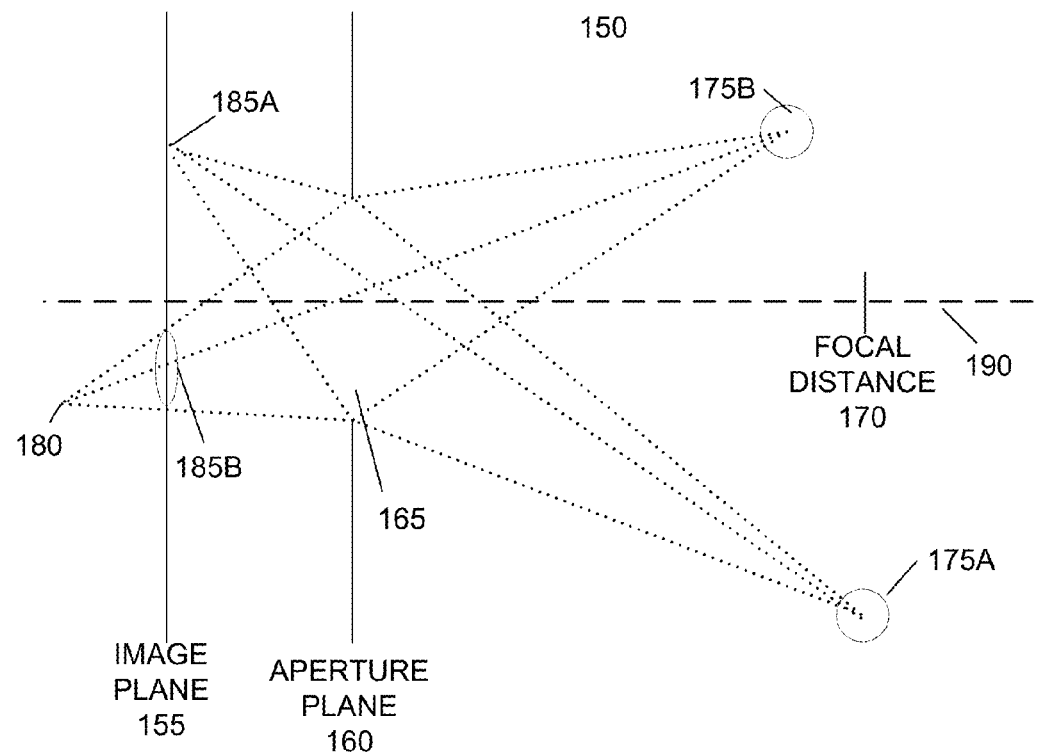

FIGS. 1A and 1B illustrate the cause of depth of field effects in real-world optical systems. FIG. 1A illustrates an example optical system 100 including an image plane 105 for receiving light that forms an image and an aperture plane 110 to admit light from a scene onto the image plane 105. Aperture plane 110 include an aperture or opening 115 to admit light from the scene. In example system 100, aperture 115 is a pinhole aperture, which ideally is infinitesimally small. System 100 has an infinite depth of field. The light from any object, regardless of its distance from the aperture plane 110, will pass through a single point, the pinhole aperture 115, and be focused perfectly on the image plane 105. For example, light from objects 125a and 125b are both focused to a single point 130 on image plane 105. An optical axis 135 is perpendicular to the image plane 105 and passes through the aperture 115.

In contrast, FIG. 1B illustrates an optical system 150 with a finite depth of field. System 150 includes an image plane 155 and an aperture plane 160. Aperture plane 160 includes an aperture 165 to admit light on to the image plane 155. Aperture 165 is relatively large compared to the pinhole aperture 115 of system 100. Although omitted for clarity from FIG. 1B, system 150 also includes lenses, mirrors, or other optical elements to focus light onto the image plane 155. An optical axis 190 is perpendicular to the image plane 155 and passes through the center of the aperture 165.

In system 150, light from any point in the scene may pass through different points of the aperture 165. For objects at or near focal distance 170, such as object 175A, light will be focused on to a single point of the image plane 155 (or a small, relatively imperceptible circle). For example, light from object 175A passes through many points of aperture 165 and is focused to point 185A on image plane 155.

Light from objects further away from focal distance 170 (either in front of or behind the focal distance 170) will be focused to points ahead or behind to the image plane 155. As a result, the light hitting the image plane 155 will form a circle or other shape, rather than a point. This out of focus light on the image plane 115, referred to as a circle of confusion, appears as a blur in the image. For example, the light from object 175B passes through many points of the aperture 165 and is focused on point 180, which is behind image plane 165. The light from object 175B forms the circle of confusion 185B on the image plane 155. Thus, object 175B appears blurred or out of focus in the image. Typically, the size of the circle of confusion or the amount of blurring increases as the size of the aperture increases relative to the focal distance 175. Thus, increasing the aperture size decreases the depth of field, or range of distances in which objects are perceived to be in focus.

A renderer typically produces one or more computer generated images from scene data by sampling optical attributes of the scene data at a number of different image sample points located on a virtual image plane. Image sample points can correspond with pixels in the rendered image or with sub-pixel samples that are combined by the renderer to form pixels in the rendered image. Image sample points such as pixels and sub-pixel samples may be distributed in regular locations on the image plane or at random or pseudo-random locations on the image plane to reduce aliasing and other sampling artifacts.

Renderers can sample attributes of scene data in a number of different ways. In ray tracing, a renderer assigns a sampling ray to each image sample point and traces the path of the sampling ray through the three-dimensional scene. When a sampling ray intersects a portion of the scene, such as the surface of an object, the renderer determines the attribute values, such as the color and transparency of the intersected portion of the scene. In some cases, the renderer may create additional sample rays originating at the intersected portion of the scene to determine effects such as illumination, shadowing, scattering, reflection, and refraction. The renderer traces the path of these additional sample rays through the scene to determine their intersections, if any, with further portions of the scene. The attribute values sampled by the initial sample ray and any additional sample rays are combined to determine the final attribute value of an image sample point. In embodiments of the invention, projection and rasterization techniques can be used to determine the intersections between sample rays and portions of the scene as an alternative to ray tracing. These embodiments produce equivalent results to ray tracing techniques.

As discussed above, depth of field effects occur because light from an object can travel through many different points of an aperture before reaching the image plane. Renderers can create depth of field effects in computer graphics images by placing a virtual lens or aperture over each of the image sample points. The renderer assigns different virtual lens or virtual aperture positions to sample rays. By associating sample rays with different portions of the aperture and evaluating a large number of image sample points, depth of field effects can be simulated.

Figure 2A:
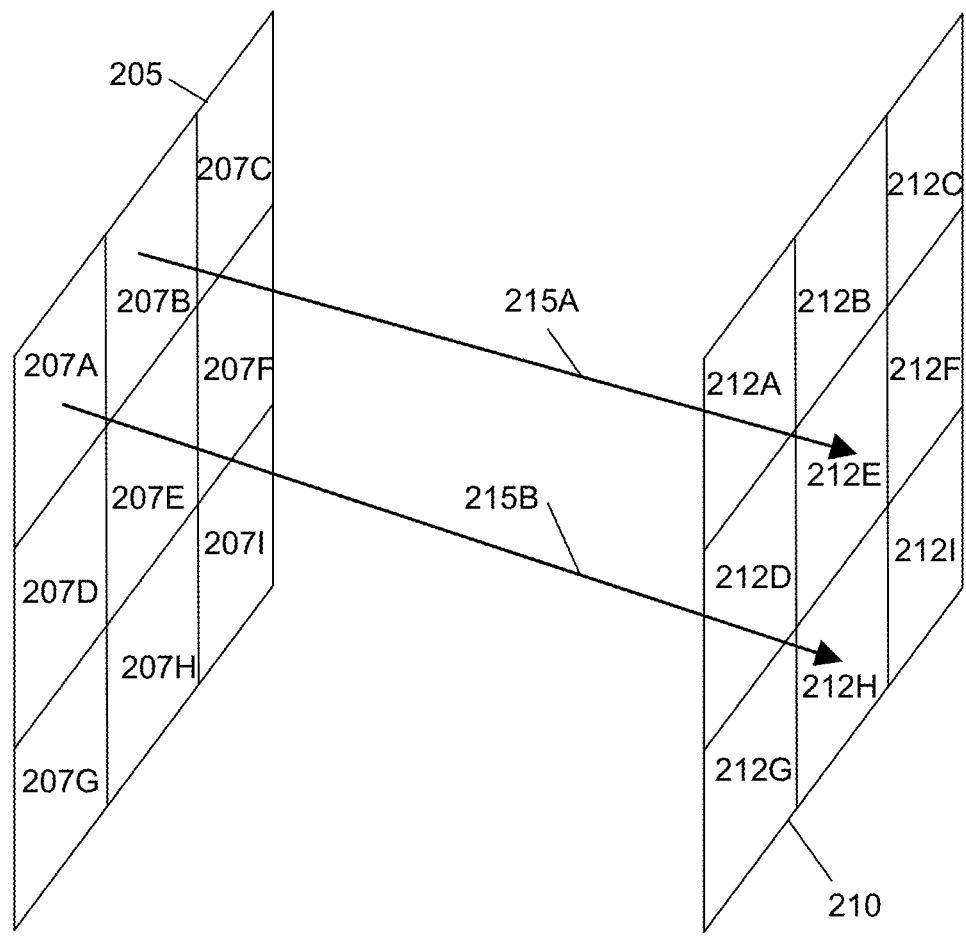
FIGS. 2A-2C illustrate the distribution of image sample points for depth of field effects according to an embodiment of the invention.
Figure 2B:
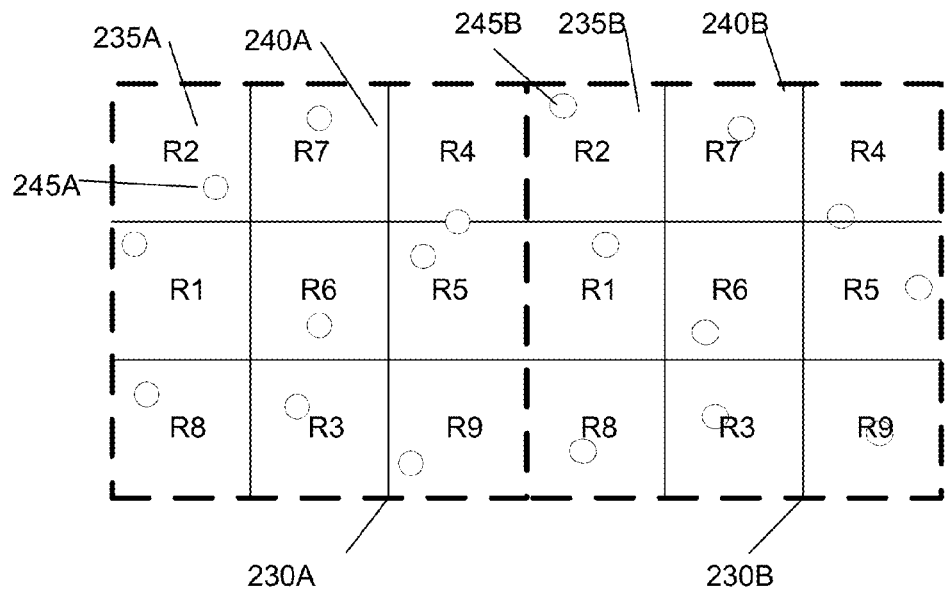
Figure 2C:
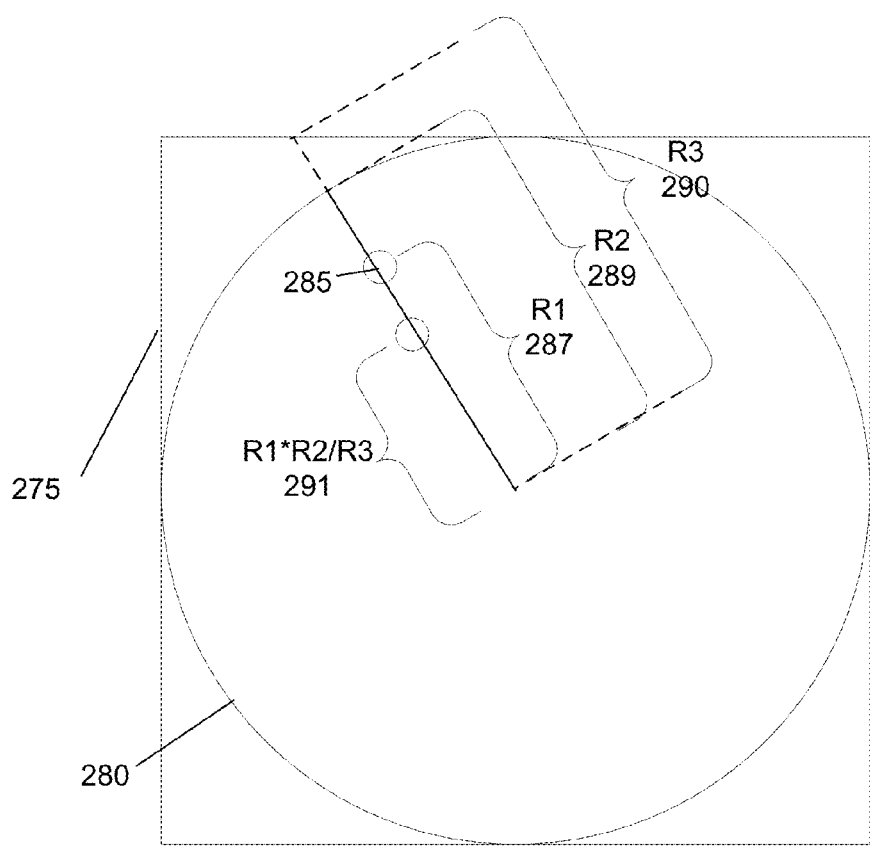

FIGS. 2A-2C illustrate the distribution of image sample points and sample rays for depth of field effects according to an embodiment of the invention. In an embodiment, image sample points in the image plane can be distributed in a random or pseudo-random manner to prevent unwanted visual artifacts and aliasing. FIG. 2A illustrates a stratified assignment of lens positions to image sample points, thereby defining the paths of sample rays. In an embodiment, a region of the image plane 205, which may correspond with the region of a pixel, is subdivided into a number of pixel regions 207A-207I. Each pixel region 207 includes one image sample. Within a pixel region 207, the image sample is assigned a random, pseudo-random, or other arbitrary or irregular location. For different pixels, image sample points may be assigned different locations within corresponding pixel regions. By stratifying image sample points into pixel regions, the variance of the distribution of image sample points in region 205 decreases. This reduces the amount of visual noise in images.

Similarly, a region of an aperture plane 210 is subdivided into a number of lens regions 212A-512I. Each lens region 212 of the aperture plane includes one or more lens positions.

Within a lens region 212, lens positions are assigned a random, pseudo-random, or other arbitrary or irregular location. By stratifying lens positions into lens regions, the variance of the distribution of lens positions in region 212 decreases. This reduces the amount of visual noise in images.

In an embodiment, each pixel region 207 of the image plane is associated with one of the lens regions of the aperture plane. For example, pixel region 207A is associated with aperture plane lens region 212H. This defines the sample ray 215B. Similarly, pixel region 207B is associated with the aperture plane lens region 212E, defining sample ray 215A. The number of lens regions 212 of the aperture plane may be the same or different from the number of pixel regions 207 of the image plane. Thus, there may be zero, one, or more image sample points associated with each aperture plane lens region 212.

In an embodiment, there is no correlation between pixel regions of each pixel on the image plane and the assigned aperture plane lens region. This reduces potential visual artifacts from aliasing. In an alternate embodiment, there is a correlation between pixel regions of each pixel on the image plane and the assigned aperture plane lens region. FIG. 2B illustrates an example of this correlation. FIG. 2B illustrates two adjacent pixels, 230A and 230B. Each pixel includes a number of pixel regions, such as pixel regions 235A and 240A in pixel 230A and pixel regions 235B and 240B in pixel 230B. Each pixel region is associated with a lens region of the aperture plane. In this example, corresponding pixel regions of pixels are associated with the same lens region of the aperture plane. For example, both pixel regions 235A and 235B are associated with the same aperture plane lens region, referred to here as lens region L2. Similarly, both pixel regions 240A and 240B are associated with the same aperture plane lens region, referred to here as lens region L7.

Although corresponding pixel regions of pixels are associated with the same aperture plane lens region, in an embodiment, image sample points are assigned different lens positions within the lens region. For example, the image sample associated with pixel region 235A is assigned to lens position 245A, located in the bottom right corner of the aperture plane lens region L2. In contrast, the image sample associated with pixel region 235B is assigned lens position 245B, which is located in the upper left corner of the aperture plane lens region L2. By displacing or jittering lens positions and image sample positions within aperture plane and image plane regions, aliasing and other unwanted visual artifacts are reduced. Moreover, as discussed above, the stratification of image sample points and lens positions into regions reduces the variance of visual noise.

As shown in FIGS. 2A and 2B, lens positions are distributed over a square region of the aperture plane. However, real-world apertures are often circular or closely approximate circles using mechanical irises. FIG. 2C illustrates an example transformation of a lens position in a square aperture to a corresponding lens position in a circular aperture. A lens position 285 is defined within a square or rectangular aperture 275. A circular aperture 280 is defined within the square aperture 275. To map the lens position 285 to the circular aperture, an embodiment of the invention measures the distance R1 287 from the center of the apertures to the lens position 285. The distance R2 289 from the center of the apertures to the edge of circular aperture 280, passing through lens position 285 is also measured. The distance R3 290 from the center of the apertures to the edge of the square aperture 275, passing through lens position 285 is also measured. In an embodiment, a new lens position 291 within the circular aperture 280 is defined by scaling the radial distance R1 287 by the ratio of the distances R2 289 and R3 290 to the edges of the apertures 280 and 275. Thus, the lens position 285 is moved to a new radial distance defined by R1*R2/R3.

FIGS. 1A-1B and 2A-2C describe the implementation of depth of field effects in rendering computer graphics images. Other visual effects can be created using diverging sample rays in a similar manner as the depth of field effects described above. For example, illumination, scattering, shadowing, reflection, and refraction effects can be created by generating a set of diverging sample rays originating from the surface or interior of an object in a scene or from other elements in a scene.

For depth of field and other visual effects, the distance between sample rays increases with the distance from the sample rays' origin. As a result, portions of the scene that are farther away from the sample rays' origin are more likely to be undersampled by sample rays. This can lead to unwanted visual artifacts when rendering effects such as sampling-based illumination, scattering, shadowing, reflection, refraction, and depth of field. These unwanted visual artifacts may appear as aliasing if non-stochastic sampling is used by the renderer or as visual noise if stochastic sampling is used by the renderer.

To address this problem, an embodiment of the invention adaptively changes the number of sample rays to reduce or eliminate aliasing and/or noise. An embodiment increases the number of sample rays as the distance from the sample rays' origin increases. This reduces or eliminates undersampling and aliasing and/or noise for sample-based effects. Additionally, the number of sample rays may be reduced as the distance to the sample rays origin decreases, which may occur when creating depth of field effects. This decreases the time and computational resources needed for rendering.

Figure 3A:
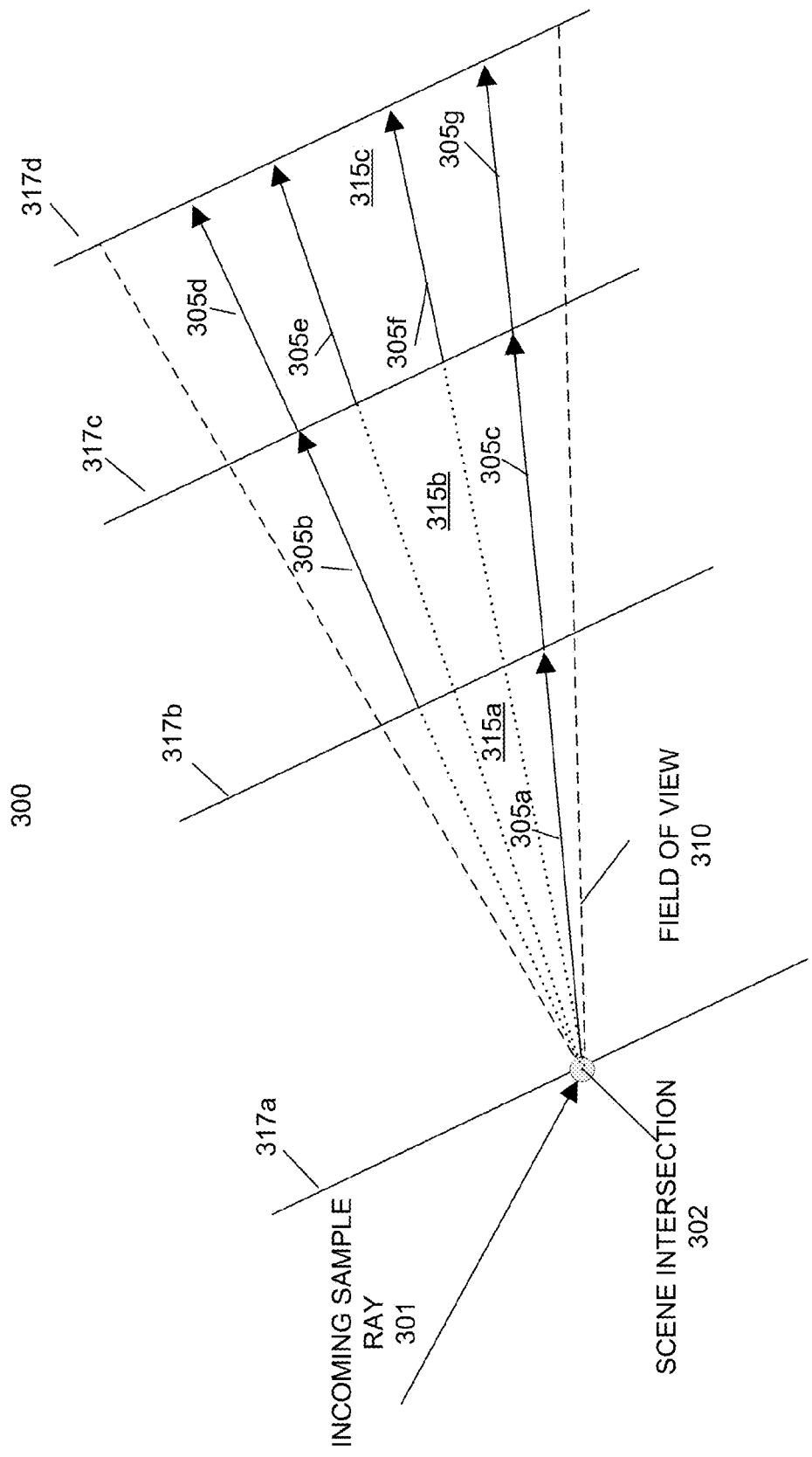
FIGS. 3A-3D illustrate adaptive sampling for depth of field effects according to an embodiment of the invention.

FIGS. 3A-3D illustrate adaptive sampling for sample-based effects such as illumination, scattering shadowing, reflection, refraction, and depth of field according to an embodiment of the invention. FIG. 3A illustrates a portion of a scene 300. Scene 300 includes an incoming sample ray 301 intersecting an element of a scene at intersection point 302. The element of the scene may be a surface, interior point, volume, implicit surface, particle, or any other representation of geometry or other item that can potentially affect the attribute values of the image sample point associated with the sample ray 301.

In response to the intersection of the sample ray 301 at intersection point 302, the renderer determines the attribute values, such as the color and transparency of the intersected portion of the scene. The renderer may also define one or more additional sample rays 305 for further sampling additional portions of the scene to determine effects such as illumination, shadowing, scattering, reflection, and refraction. The renderer traces the path of these additional sample rays through the scene to determine their intersections, if any, with further portions of the scene. The attribute values sampled by the initial sample ray and any additional sample rays are combined to determine the final attribute value of an image sample point.

The number, direction, and behavior of the additional sample rays 305 depend on the type of effect being created; the attributes of the scene at the intersection point 302, such as a surface normal, index of refraction, or BRDF; and the desired renderer performance and image quality. For example, for illumination and shadowing effects, additional sample rays 305 are directed from the intersection point 302 to points within one or more light sources to determine the amount and direction of light reaching the intersection point 302. For reflection, refraction, and scattering effects, additional sample rays 305 are directed according to the reflection, refraction, and/or scattering parameters of the scene at the intersection point.

In some applications, the additional sample rays 305 are defined as originating from the intersection point 302 and traveling within a field of view 310. Field of view 310 begins at intersection point 302. In an embodiment, the field of view 310 is divided into two or more depth regions 315. Each of the depth regions 315 is defined by one or more depth boundaries 317. For example, a first depth region 315a is defined by a first depth boundary 317a and a second depth boundary 317b. A second depth region 315b is defined by the second depth boundary 317b and a third depth boundary 317c. Similarly, a third depth region 315c is defined by the third depth boundary 317c and a fourth depth boundary 317d. The number of depth regions 315 shown in FIG. 3A is intended for illustration and additional depth regions may be defined as needed.

Each of the depth regions includes one or more of the sample rays 305. For example, depth region 315a includes sample ray 305a. An embodiment of the invention samples the portion of the scene within a depth region using the sample ray or rays 305 associated with that depth region. For example, an embodiment of the invention samples the portion of the scene with the depth region 315a using sample ray 305a. Similarly, depth region 315b includes two sample rays 305b and 305c; thus, an embodiment of the invention samples the portion of the scene within depth region 315b using sample rays 305b and 305c. Continuing with this example, an embodiment of the invention samples the portion of the scene within depth region 315c using sample rays 305d, 305e, 305f, and 305g.

In an embodiment, the number of sample rays in each depth region increases or stays constant as the depth regions increase in distance from the origin of the sample rays, which in this example is the intersection point 302.

In an embodiment, the rays introduced in one depth region are carried over to successive depth regions. In this embodiment, successive depth regions add new sample rays to augment the sample rays carried over from previous depth regions. For example, sample ray 305a introduced in the first depth region 315a continues into the second depth region 315b, such that sample ray 305b that is co-linear with sample ray 305a. In depth region 315b, sample ray 305a may be augmented by sample rays 305c.

In an alternate embodiment, the sample rays introduced in one depth region are discarded in successive depth regions. In this embodiment, successive depth regions add new sample rays to replace the sample rays from previous depth regions. For example, sample ray 305a introduced in the first depth region 315a and is discarded in the second depth region 315b. In depth region 315b, additional sample rays 305b and 305c replace discarded sample ray 305a. Sample rays 305b and 305c may or may not be collinear with sample ray 305a.

As can be seen in FIG. 3A, the renderer samples the scene with more rays and effectively more image subsamples for depth regions that are further away from the lens aperture plane. As a result, distant objects are sampled at approximately the same image sampling frequency as objects closer to the camera. The example of FIG. 3A can be extended to include any number of depth regions.

Embodiments of the invention may measure distance from any reference, such as the lens aperture plane, the image plane, an arbitrary point or plane, and, in some cases, from the near or far focal plane. Additionally, embodiments of the invention may use any type of distance metric, including distance between two points, distance along a sample ray from the reference, and the perpendicular distance between a point on a sample ray and a reference plane.

In an embodiment, the orientations of the sample rays are randomly or pseudo-randomly determined for each depth region.

Figure 3B:
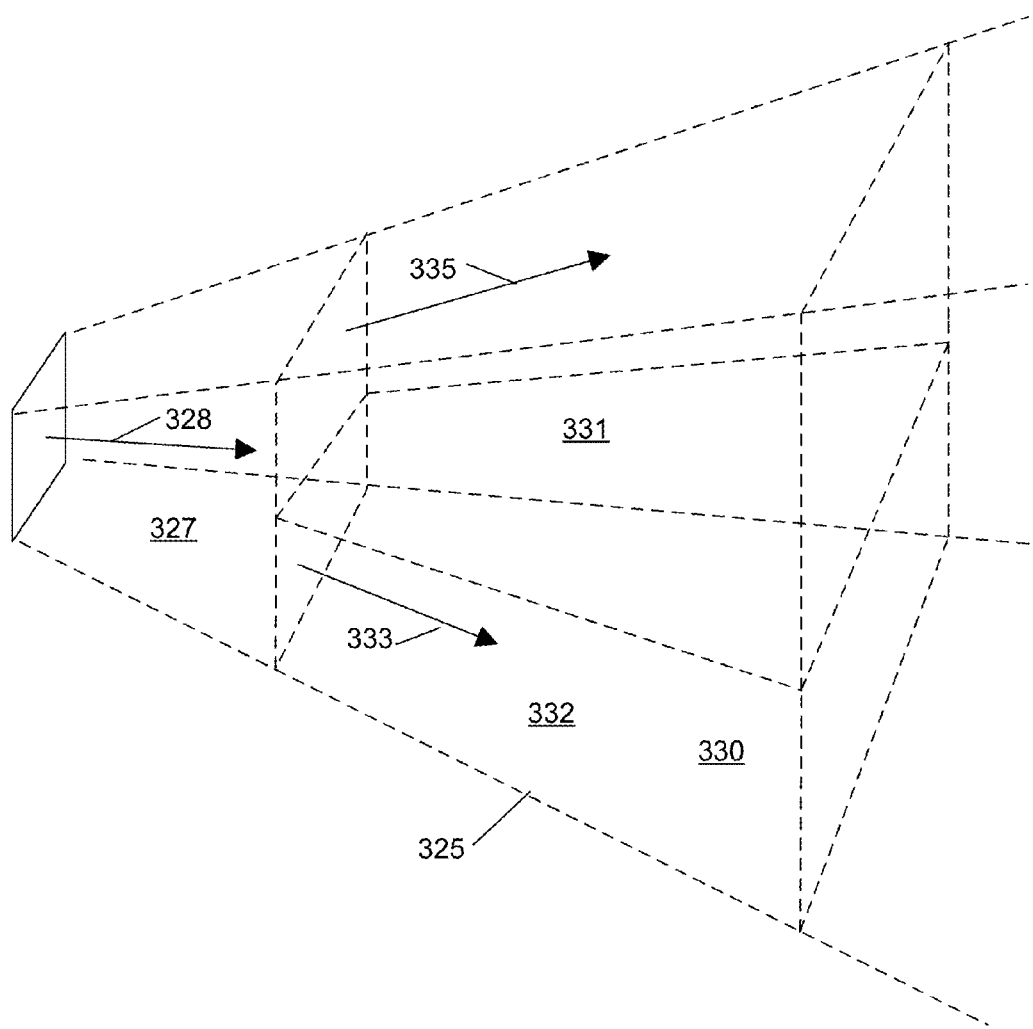

FIG. 3B illustrates an example distribution of sample rays for different depth regions according to an embodiment of the invention. A field of view 325 includes depth regions 327 and 330. Depth region 327 includes a sample ray 328. In a further embodiment, the orientation of the sample ray 328 is randomly or pseudo-randomly selected.

Similarly, depth region 330 includes sample rays 333 and 335. In an embodiment, the depth region 330 is partitioned into two or more sub-volumes, such as sub-volumes 331 and 332. In this embodiment, the sample rays in depth region 330 are distributed equally among the two or more sub-volumes. For example, sample ray 333 is located within sample ray sub-volume 332 and sample ray 335 is located within ray sub-volume 331. In another example, if there are N sample rays within a depth region, then the depth region in this embodiment may be divided into N sub-volumes, each of which includes one sample ray. By distributing sample rays among two or more sub-volumes, the variance of the noise is reduced. In an embodiment, the location of each sample ray within its associated sub-volume is randomly or pseudo-randomly selected, as described above, to reduce the appearance of aliasing.

Figure 3C:
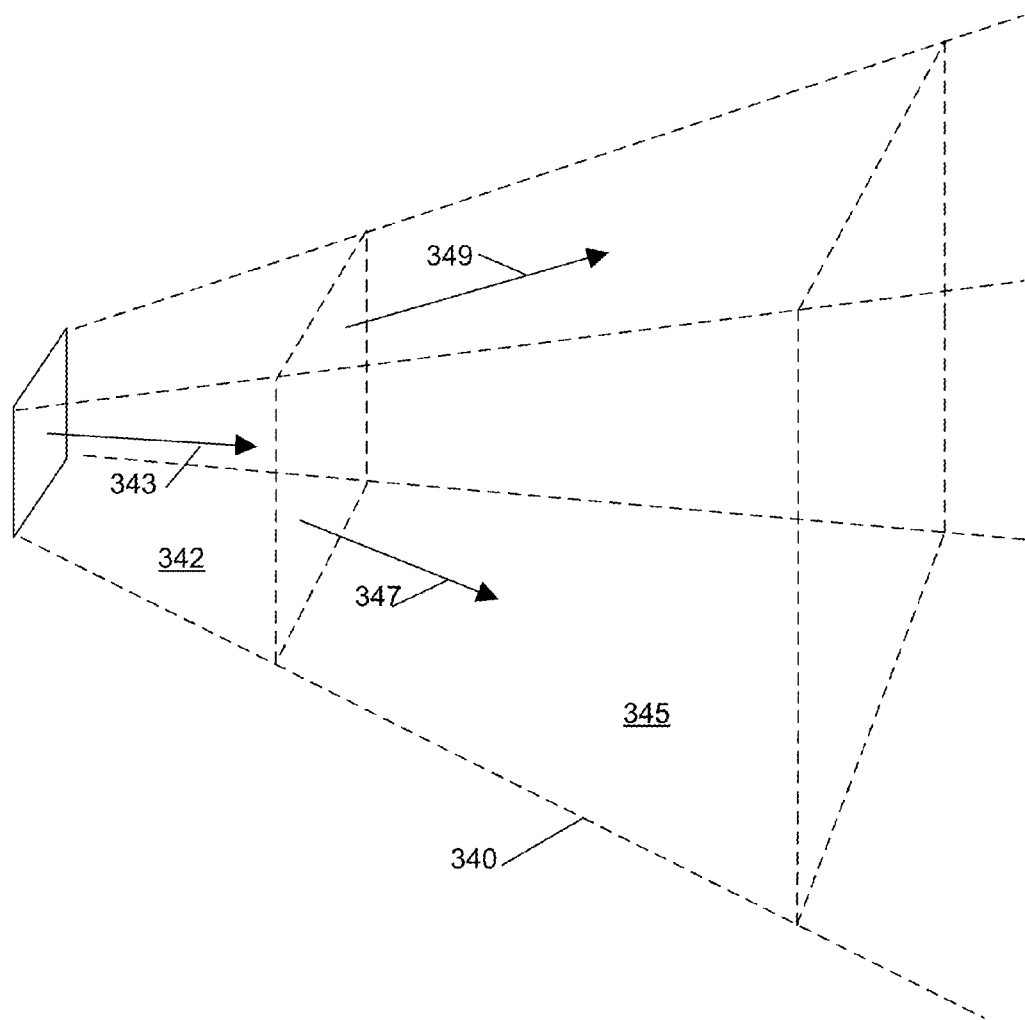

FIG. 3C illustrates another example distribution of sample rays for different depth regions according to an embodiment of the invention. A field of view 340 includes depth regions 342 and 345. Depth region 342 includes a sample ray 343.

Similarly, depth region 345 includes sample rays 347 and 349. In this embodiment, the depth region 345 is not partitioned into sub-volumes and the sample rays 347 and 349 may be located anywhere within depth region 345. In a further embodiment, the location of each ray within its associated depth region is randomly or pseudo-randomly selected, as described above, to reduce the appearance of aliasing. In a further embodiment, the sample rays may be distributed within depth regions using a Halton sequence to ensure a uniform distribution of sample rays.

Figure 3D:
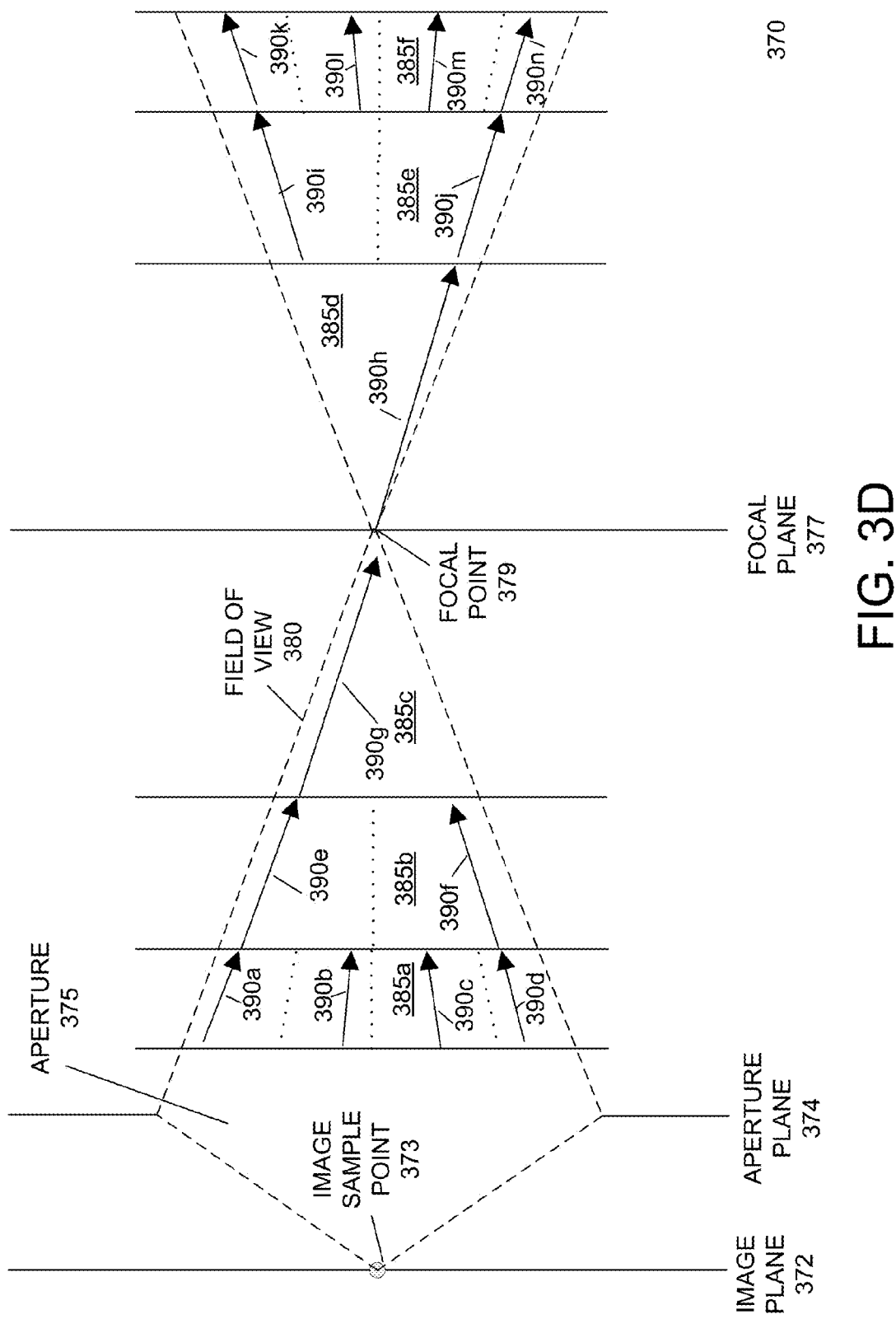

FIG. 3D illustrates an example application of an embodiment of the invention to depth of field effects. For depth of field effects, an embodiment of the invention increases the number of sample rays in each depth region as the distance from the focal point increases. However, in depth of field effects, some portions of the scene may lie in front of the focal point. Thus, the number of sample rays per depth region will first decrease as portions of the scene in front of the focal point are rendered, and then increase as portions of the scene behind the focal point are rendered.

FIG. 3D illustrates an example scene 370. Scene 370 includes an image plane 372 including an image sample point 373, an aperture plane 374 including a virtual lens aperture 375, and a focal plane 377 including a focal point 379. A field of view 380 of the image sample point 373 is defined by the size of the virtual lens aperture 375 and the focal point 379. As can be seen in example scene 370, the field of view 380 converges between the virtual lens aperture 375 and the focal point 379 and then diverges from the focal point 379 onwards.

An embodiment of the invention divides the field of view 380 into a plurality of depth regions 385. The depth region 385a closest to the virtual lens aperture 375 includes an initial number of sample rays, such as sample rays 390a, 390b, 390c, and 390d. As the depth regions 385 get closer to the focal point 379 and further from the virtual lens aperture 375, each successive depth region includes fewer sample rays. For example, depth region 385b includes sample rays 390e and 390f and depth region 385c includes sample ray 390g. There may be any number of depth regions between the virtual lens aperture 375 and the focal point 379.

Beyond the focal point 379, the field of view 380 diverges. Thus, the number of sample rays in depth regions behind the focal point 379 increases monotonically with distance from the focal point 379. For example depth region 385d includes sample ray 390h, depth region 385e includes sample rays 390i and 390j, and depth region 385f includes sample rays 390k, 390l, 390m, and 390n. Further depth regions may include more sample rays than depth region 385f.

An embodiment of the invention reduces the number of sample rays in each depth region in response to occlusion or intersections with scene geometry in previous depth regions. For example, if sample rays 390a and 390b both intersect scene geometry in depth region 385a, then corresponding sample ray 390e is omitted from depth region 385b. In this embodiment, within the converging portion of the field of view 380, each sample ray in a depth region may correspond with two or more sample rays in the previous depth region. Similarly, within the diverging portion of the field of view 380, one or more sample rays in a depth region may correspond with a sample ray in the previous depth region.

If only one of these sample rays 390a or 390b intersects scene geometry in depth region 385a, then corresponding sample ray 390e and any corresponding sample rays in further depth regions is weighted by 50%. Similarly, if a sample ray intersects partially transparent scene geometry, then corresponding sample rays in subsequent depth regions are weighted according to the amount of light passing through the intersected partially transparent scene geometry.

In an embodiment, the depth boundaries defining depth regions are positioned at equal depth intervals. For example, each depth boundary has a depth defined as NK, where N is an integer and K is a constant. In another embodiment, the depth boundaries are positioned at equal intervals of depth disparity. Depth disparity is equal to the inverse of the depth. Depth disparity takes into account the effect of visual perspective. For example, each depth boundary has a depth defined as 1/NK, where N is a non-zero integer and K is a constant. In still another embodiment, the depth boundaries are positioned such that each ray samples the same (or approximately the same, if jitter is applied) volume. For example, the volume of each depth region divided by the number of sample rays or subsamples in that volume may be a constant for all depth regions in a field of view.

Figure 4:
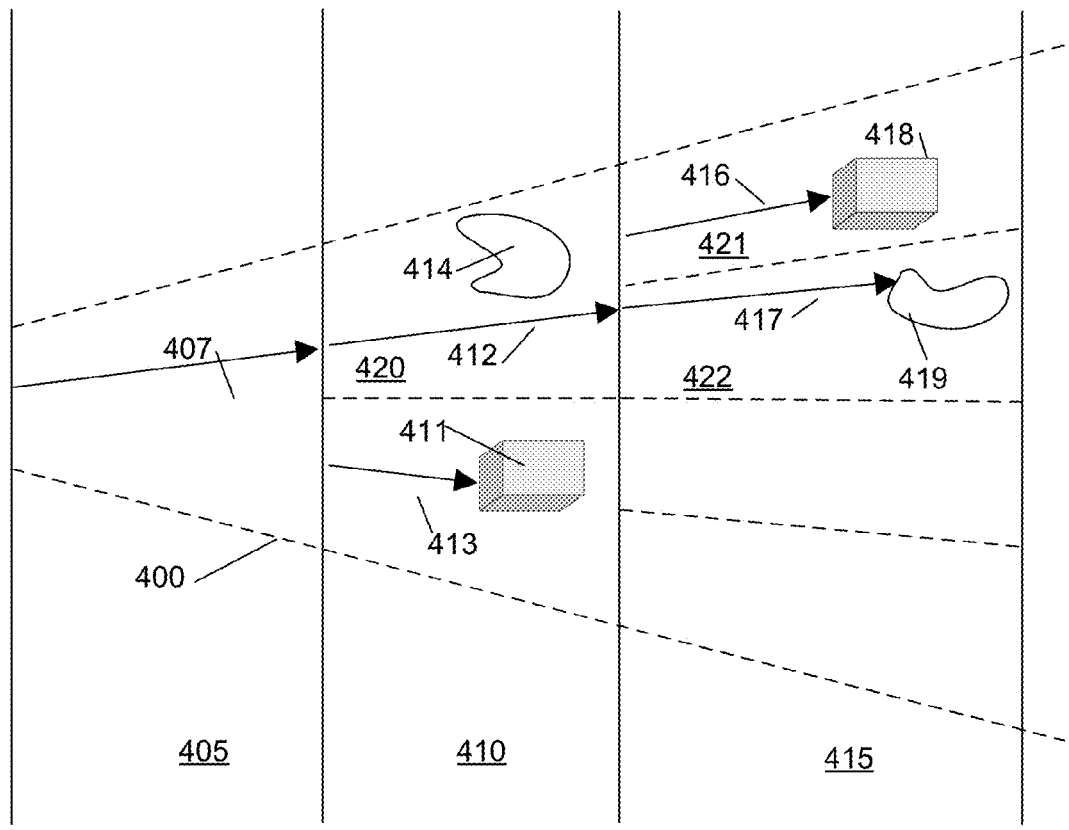
FIG. 4 illustrates an example application of adaptive depth of field sampling according to an embodiment of the invention.

FIG. 4 illustrates an example application of adaptive depth of field sampling according to an embodiment of the invention. A field of view 400 corresponds with the view of a scene from a pixel region including one or more image sample points. As described above, field of view 400 includes depth regions 405, 410, and 415. Depth region 405 includes a single sample ray 407, corresponding to a single image sample point and a single lens aperture position. As sample ray 407 does not intersect any objects in the scene, sample ray 407 is partitioned in depth region 410 into at least two sample rays 412 and 413. In an embodiment, sample rays 412 and 413 may be associated with different lens aperture positions than sample ray 407. In another embodiment, sample ray 412 may have the same lens aperture position as sample ray 407, while sample ray 413 may have a different lens aperture position. Sample rays 412 and 413 correspond with two image subsamples to be used to determine the value of the image sample point. In this example, sample ray 413 intersects object 411; thus, the renderer determines a value for the image subsample corresponding with sample ray 413.

Additionally, sample ray 412 does not intersect object 414. Thus, sample ray 412 is partitioned in depth region 415 into additional sample rays 416 and 417. Sample rays 416 and 417 correspond with two additional image subsamples to be used to determine the value of the image sample point. In an embodiment, if a sample ray representing an image sample or subsample in a first depth region does not intersect an object, it is converted into two or more sample rays representing two or more subsamples in the next depth region. Conversely, if a sample ray in a first depth region does intersect an opaque object, it will not generate any additional sample rays or corresponding subsamples in the next depth region. In this example, sample rays 416 and 417 intersect object 418 and 419, respectively. Thus, no additional depth regions need to be evaluated for this field of view 400. In a further embodiment, no additional depth regions or image sample points are evaluated if the depth exceeds the limits of objects in the scene or a specified far clipping plane or depth boundary.

If a sample ray representing an image sample or subsample intersects a partially transparent object, the sample ray or associated image sample or subsample accumulates a transparency or opacity value from the intersected object. If the accumulated transparency or opacity value of the sample ray reaches or passes a threshold value, for example 99% opaque or 1% transparent, the sample ray is considered to have hit an opaque object and no additional sample rays will be created from this sample ray in the next depth region.

In an embodiment, the number of sample rays and corresponding image subsamples of a depth region is determined based on the proportion of sample rays in the previous depth region that do not intersect opaque objects. In a further embodiment, each depth region is divided into one or more sub-volumes. Each sub-volume in a first depth region is associated with two or more sub-volumes in the next depth region. For example, sub-volume 420 of depth region 410 is associated with sub-volumes 421 and 422 of depth region 415. In this further embodiment, if the sample ray of a sub-volume does not intersect an opaque object, then the two or more sample rays of the associated sub-volumes of the next depth region are evaluated by the renderer. For example, if sample ray 412 does not intersect an object, then the renderer evaluates sample rays 416 and 417.

Once all of the image subsample values of a field of view have been determined, they can be combined to determine the value of the image sample point. In an embodiment, image subsample values are weighted and added together. For example, sample ray 407 has a weight of 1.0, sample rays 412 and sample rays 413 each have weights of 0.5, and sample rays 416 and 417 each have weights of 0.25. (Depth region 415 could include four sample rays, if sample ray 413 had not intersected object 411). In the example of FIG. 4, the image sample point will have a value of 0.5 times the subsample value of sample ray 413, 0.25 times the subsample value of sample ray 416, and 0.25 times the subsample value of sample ray 417.

In an embodiment, each image subsample value is assigned a weight based upon the total number of sample rays potentially included in its depth region. In still a further embodiment, the weight of subsamples in a first depth region may be derived from the weight of subsamples in another depth region.

Figure 5A:
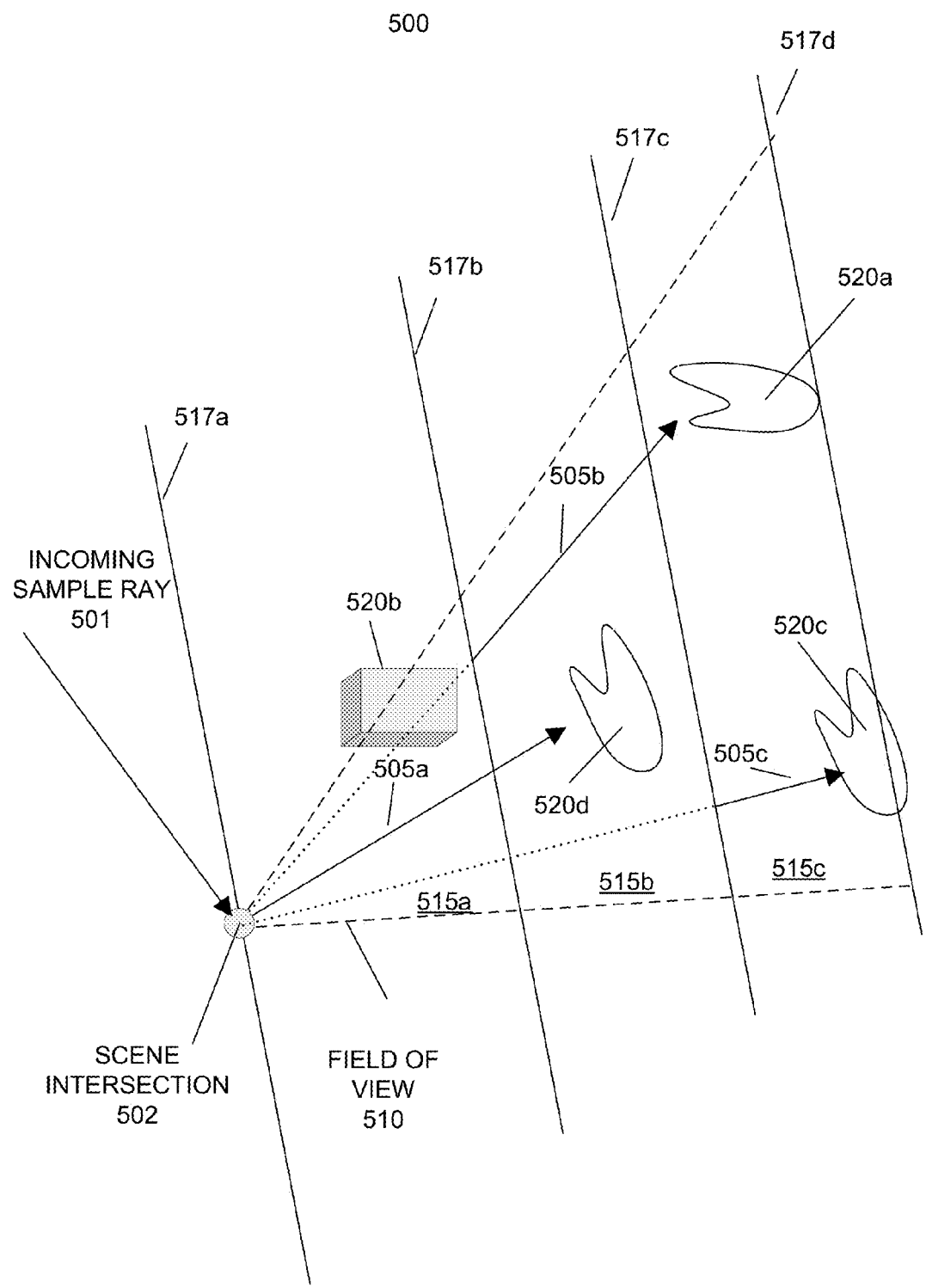
FIGS. 5A-5B illustrate example applications of adaptive sampling that compensate for occlusion effects according to embodiments of the invention.

FIG. 5A illustrates a first example application of adaptive depth of field sampling that compensates for occlusion according to an embodiment of the invention. FIG. 5A illustrates a portion of a scene 500. Scene 500 includes an incoming sample ray 501 intersecting an element of a scene at intersection point 502. In response to the intersection of the sample ray 501 at intersection point 502, the renderer determines the attribute values, such as the color and transparency of the intersected portion of the scene. The renderer may also define one or more additional sample rays 505 for further sampling additional portions of the scene to determine effects such as illumination, shadowing, scattering, reflection, and refraction. The renderer traces the path of these additional sample rays through the scene to determine their intersections, if any, with further portions of the scene. The attribute values sampled by the initial sample ray and any additional sample rays are combined to determine the final attribute value of an image sample point.

In this example, the additional sample rays 505 are defined as originating from the intersection point 502 and traveling within a field of view 510. Field of view 510 begins at intersection point 502. In an embodiment, the field of view 510 is divided into depth regions 515, including a first depth region 515a, defined by depth boundaries 517a and 517b, a second depth region 515b, defined by depth boundaries 517b and 517c, and a third depth region 515c, defined by depth boundaries 517c and 517d. The number of depth regions 515 shown in FIG. 5A is intended for illustration and additional depth regions may be defined as needed.

As described above, the maximum potential number of sample rays in each depth region increases or stays constant as the depth regions increase in distance from the origin of the sample rays, which in this example is the intersection point 502. For example, if a first sample ray 505a does not intersect any objects in the first depth region 515a, then an embodiment of the invention evaluates the second depth region 515b using two or more sample rays. Similarly, if none of the sample rays in the second depth region 515b intersect any objects, then an embodiment of the invention evaluates the third depth region 515c using four or more sample rays. However, as described above, sample rays that intersect an opaque object in a depth region or accumulate sufficient opacity from semi-opaque portions of the scene will terminate in that depth region. Thus, the actual number of sample rays in a depth region may be less than or equal to the maximum potential number of sample rays for that depth region due to intersections of sample rays with objects and other elements of the scene.

To increase the number of sample rays used to evaluate depth regions, an embodiment of the invention may add one or more new sample rays to a depth region to augment each sample ray carried over from the previous depth region.

Occlusion errors are one problem introduced due to adding new sample rays to depth regions as the distance from the sample ray origin increases. When a sample ray is added to any depth region after the first depth region, there is no guarantee that this newly added sample ray would not have intersected an object in a previous depth region. For example, sample ray 505b is added to the scene 500 in the second depth region 515b. This new sample ray 505 continues from depth region 515b to depth region 515c, where it intersects object 520a. In some embodiments of the invention, a renderer may determine the contribution of object 520a to an image sample or subsample associated with sample ray 505b and incoming sample ray 501.

However, had sample ray 505b existed within the previous depth region 515a, it would have intersected opaque object 520b. The intersection with opaque object 520b would have blocked sample ray 505b from progressing to depth regions 515b and 515c. Thus, object 520a would not have been visible to sample ray 505b. By including the contribution of object 520a to an image sample or subsample associated with sample ray 505b and incoming sample ray 501, an embodiment of a renderer introduces a minor occlusion error.

In some circumstances, minor occlusion errors may be acceptable. However, a further embodiment of the invention prevents occlusion errors by back-tracing sample rays that intersect objects. In this embodiment, if the renderer detects an intersection between a sample ray and an object in a depth region, the renderer back-traces along the path of the sample ray towards its origin to determine if this sample ray would have intersected any objects or scene elements in any previous depth regions where the sample ray was not used. If the back-tracing of a sample ray intersects any opaque objects, then the contribution of this sample ray to the image sample or subsample is set to zero.

For example, sample ray 505b is added in depth region 515b and intersects object 520a in depth region 515c. However, back-tracing along the path of sample ray 505b reveals that this sample ray 505b would have also intersected opaque object 520b in depth region 515a. Thus, had sample ray 505b been defined in depth region 515a, opaque object 520b would have prevented this sample ray from reaching object 520a. Therefore, the sample ray 505b is assigned a contribution of zero to its associated image sample or subsample.

Similarly, sample ray 505c is added to the scene 500 in depth region 515c and intersects object 520c. Back-tracing sample ray 505c through previous depth regions 515b and 515a does not detect any intersections with other objects. Therefore, the intersection of sample ray 505c and object 520c may result in a non-zero contribution to its associated image sample or subsample.

Sample ray 505a originates at the scene intersection 502, passes through depth regions 515a, and intersects object 520d in depth region 515b. Because sample ray 505a is defined in all of the previous depth regions, an embodiment of the invention does not need to back-trace along this ray.

Figure 5B:
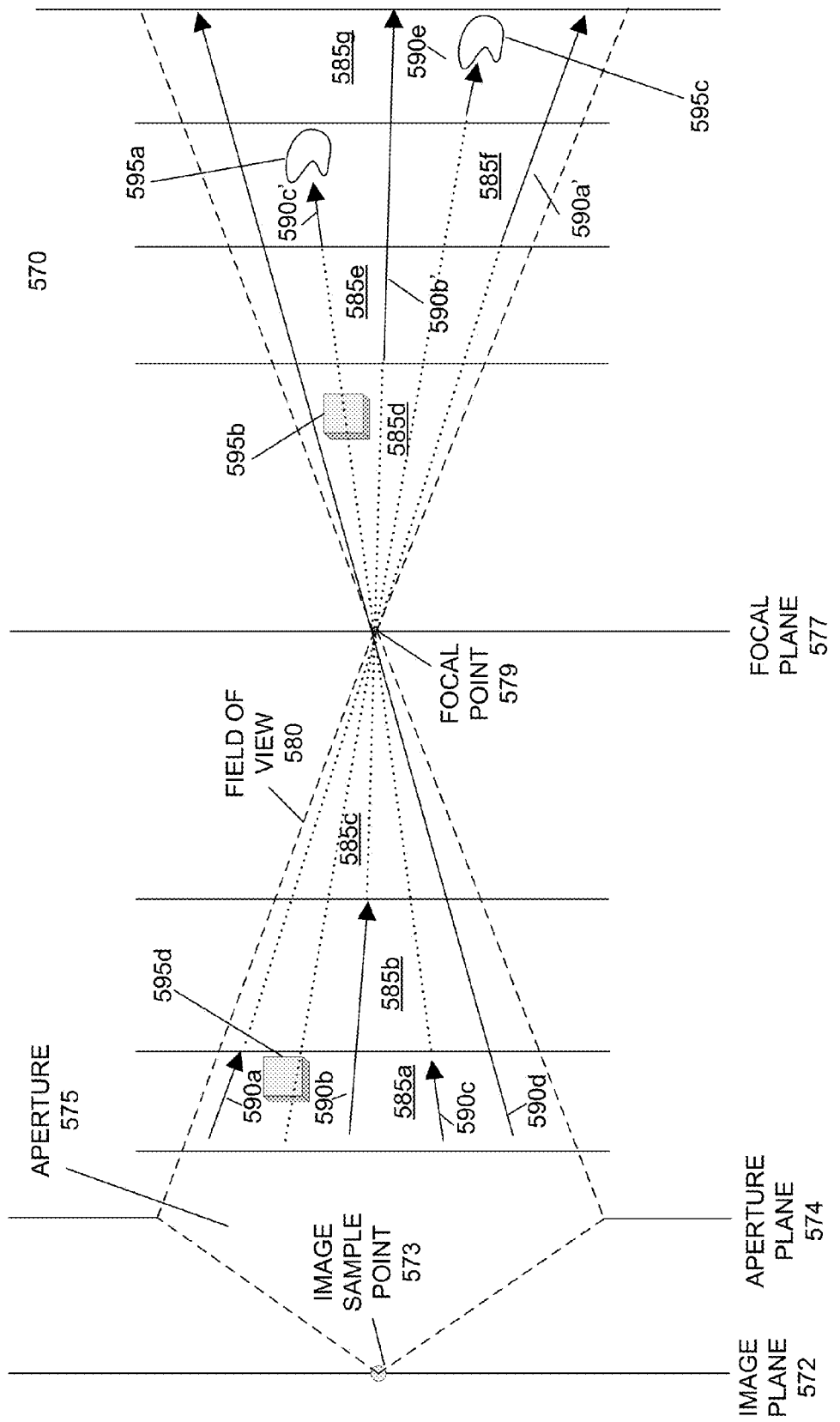

FIG. 5B illustrates a second example application of adaptive depth of field sampling that compensates for occlusion according to an embodiment of the invention. In example scene 570, the number of sample rays in each depth region increases as the distance from the focal point increases. Some portions of the scene 570 may lie in front of the focal point. Thus, the number of sample rays per depth region will first decrease as portions of the scene in front of the focal point are rendered, and then increase as portions of the scene behind the focal point are rendered.

Example scene 570 includes an image plane 572 including an image sample point 573, an aperture plane 574 including a virtual lens aperture 575, and a focal plane 577 including a focal point 579. A field of view 580 of the image sample point 573 is defined by the size of the virtual lens aperture 575 and the focal point 579. As can be seen in example scene 570, the field of view 580 converges between the virtual lens aperture 575 and the focal point 579 and then diverges from the focal point 579 onwards.

An embodiment of the invention divides the field of view 580 into a plurality of depth regions 585. The depth region 585a closest to the virtual lens aperture 575 includes an initial number of sample rays, such as sample rays 590a, 590b, 590c, and 590d. As the depth regions 585 get closer to the focal point 579 and further from the virtual lens aperture 575, each successive depth region includes fewer sample rays. For example, depth region 585b includes sample rays 590b and 590d carried over from the previous depth region 585b, and depth region 585c includes sample ray 590d carried over from previous depth region 585b. There may be any number of depth regions between the virtual lens aperture 575 and the focal point 579.

Behind the focal point 579, the field of view 580 diverges. Thus, the number of sample rays in depth regions behind the focal point 579 increases monotonically with distance from the focal point 579. For example depth region 585d includes sample ray 590d, carried over from previous depth region 585c. Depth region 585e includes sample ray 590d carried over from depth region 585d and one or more additional sample rays.

In a first embodiment, sample rays previously removed depth regions in front of the focal plane 577, such as sample rays 590a, 590b, and 590c, are restored to depth regions behind the focal plane 577. For example, depth region 585e includes an additional sample ray in the form of sample ray 590b', which is a continuation of previously removed sample ray 590b. In this example, sample ray 590b may sample the scene 570 in depth regions 585a and 585b and sample ray 590b' may sample the scene in depth regions 585e, 585f, 585g, and potentially any further depth regions.

In a second embodiment, new sample rays unrelated to the sample rays previously removed may be added to depth regions behind the focal plane 577. For example, depth region 585g includes sample rays 590d and 590b' carried over from depth region 585f. Depth region 585g also includes additional sample ray 590e. Sample ray 590e is a new sample ray that has no counterpart in any of the previous depth regions 585.

As in the example of FIG. 5A, an embodiment of the invention may use back-tracing of sample rays to prevent occlusion errors. An embodiment of the invention back-traces any sample ray intersecting an object or other scene element to determine if this sample ray would have also intersected any objects or scene elements in previous depth regions where the sample ray was not used. If the sample ray does intersect an object or scene element in a previous depth region, then this sample ray's contribution to the image sample or subsample is set to zero.

For example, sample ray 590c' intersects object 595a in depth region 585f. Back-tracing along sample ray 590c' through the depth regions that do not use this sample ray, such as depth regions 585e, 585d, 585c, and 585b. In this example, sample ray 590c' does not need to be back-traced through depth region 585a, because corresponding sample ray 590c has already been evaluated in this depth region. In this example, the back-tracing of sample ray 590c' reveals that this sample ray would have intersected object 595b, had additional sample rays been used in depth region 585d. Therefore, the contribution of sample ray 590c' to the image sample or subsample is set to zero.

Similarly, sample ray 590e intersects object 595c in depth region 585g. Because sample ray 590e does not have any counterpart in any previous depth region, an embodiment of the invention back-traces sample ray 590e through all of the preceding depth regions. In this example, back-tracing along sample ray 590e reveals that this sample ray would have intersected object 595d in depth region 585a. Therefore, the sample ray 590e should not contribute to the attribute value of the associated image sample point 573.

Figure 6:
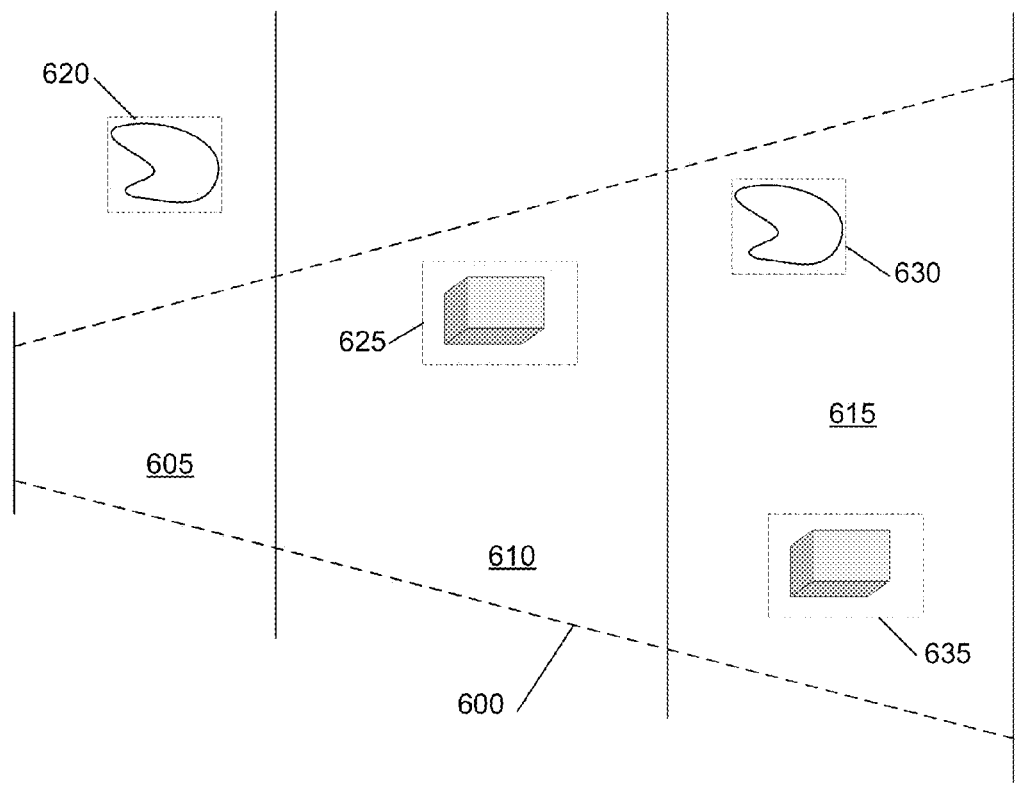
FIG. 6 illustrates the culling of example objects in a scene according to an embodiment of the invention.

FIG. 6 illustrates the culling of example objects in a scene according to an embodiment of the invention. As discussed above, each depth region is associated with depth boundaries. Thus, for each depth region, the renderer may only need to evaluate the portion of the scene within the depth boundaries of a depth region.

FIG. 6 illustrates a field of view 600 including depth regions 605, 610, and 615. For each depth region, an embodiment of a renderer may only need to evaluate portions of the scene within the depth boundaries of the depth region. Portions of the scene outside of the depth boundaries of the depth region may be culled or otherwise ignored by the renderer. For example, a renderer may only need to evaluate object 620 for depth region 605, object 625 for depth region 610, and objects 630 and 635 for depth region 615. In an embodiment, each object can be represented by a bounding box or other approximation that can be quickly tested against the depth boundaries of each depth region.

Figure 7:
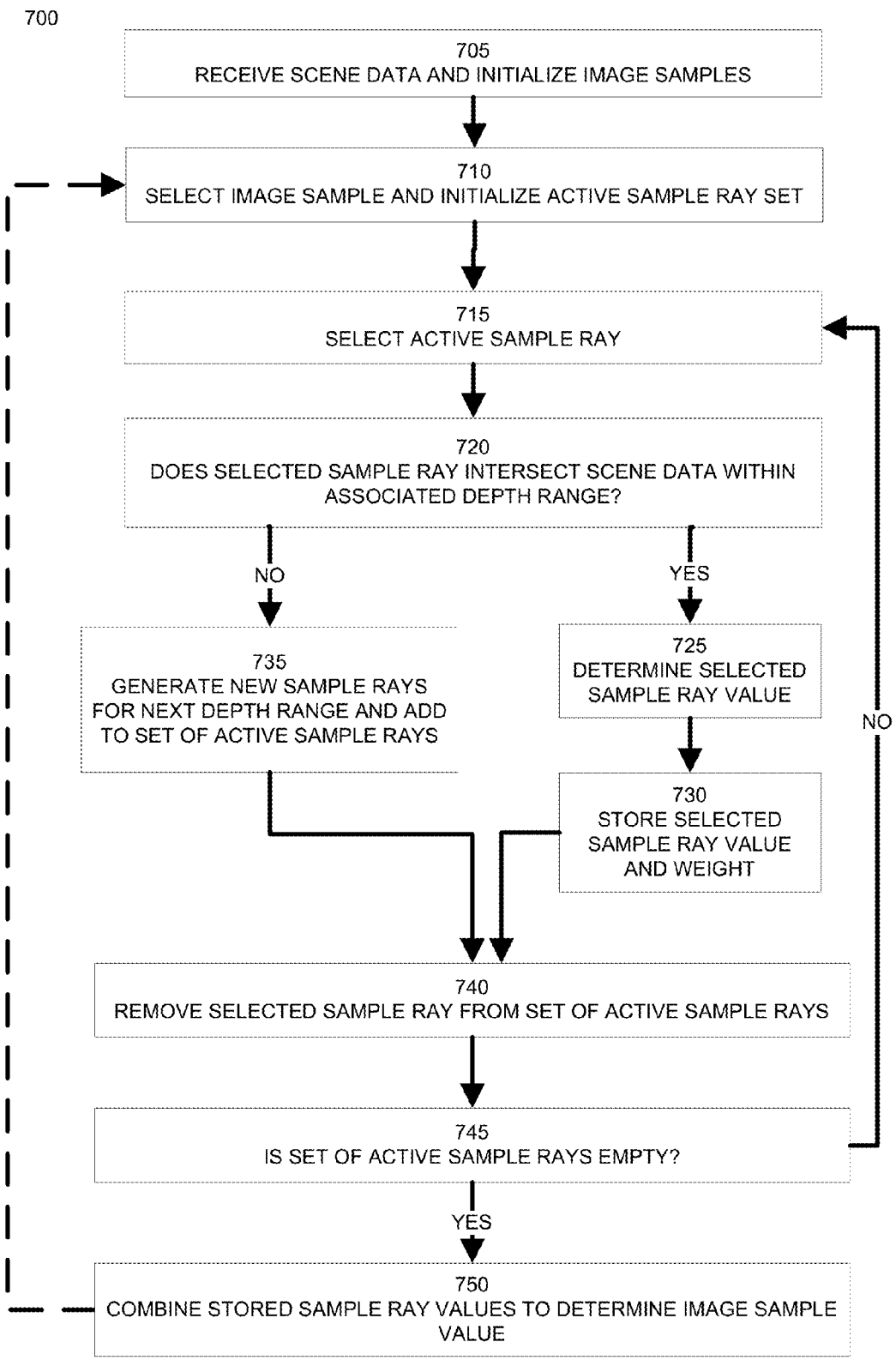
FIG. 7 illustrates a method of adaptive sampling for depth of field effects according to an embodiment of the invention.

FIG. 7 illustrates a method 700 of adaptive sampling for depth of field effects according to an embodiment of the invention. Step 705 receives the scene data defining a scene and initializes a set of image sample points. The set of image sample points defines the locations of image sample points within an image plane.

Step 710 selects one of the image sample points for rendering. For the selected image sample point, step 710 initializes a set of active image sample rays. In an embodiment, each image sample ray is defined by the position of the selected image sample point and a lens aperture position. Additionally, the set of active image sample rays are each associated with a depth region defined by a range of depth values and a weight value. In an embodiment, the set of active image sample rays is initialized with a one active image sample ray having a depth range corresponding a first depth region and a weight of 1.0.

Step 715 selects one of the active image sample rays for evaluation. Step 720 determines if the selected image sample ray intersects any objects in the scene within its depth region. If step 720 determines that selected image sample ray intersects an object in the scene within the sample ray's depth boundaries, step 725 determines the value of the selected sample ray. Steps 720 and 725 can use any rendering technique known in the art to determine if a sample ray intersects portions of the scene and the value of the sample ray, including rasterization, scanline, micropolygon, ray tracing, volume rendering, radiosity and global illumination rendering techniques. Steps 720 and 725 may evaluate geometry, apply texture, environment, displacement, lighting and shadow maps, and execute lighting and shading programs to determine the color, intensity, transparency, depth, or any other type of attribute for the value of the sample ray. Step 730 stores the selected sample ray value along with its weight for use in determining the value of the selected image sample.

Conversely, if step 720 determines that selected active image sample ray does not intersect any object in the scene within the sample ray's depth boundaries, step 735 adds one or more additional image sample rays to the set of active image sample rays. In an embodiment, each additional image sample ray is defined by the position of the selected image sample point and a lens aperture position, which may be randomly or pseudo-randomly determined. Each additional image sample ray also includes depth boundaries corresponding with the next adjacent depth region. Further, each additional image sample ray includes a weight. In an embodiment, the weight of each additional image sample ray is determined from the weight of the selected active image sample ray inversely scaled by the number of additional image sample rays added by step 735. For example, if step 735 adds two additional image sample rays, the weight of each of these image sample rays will be half of the weight of the selected active image sample ray. In another example, if step 735 adds four additional image sample rays, then the weight of each of these image sample rays will be one quarter of the weight of the selected active image sample ray.

Following either step 730 or step 735, step 740 removes the selected active image sample ray from the set of active image sample rays. Step 745 determines if the set of active image sample rays is empty. If there are active image sample rays in the set that have not been evaluated, method 700 returns to step 715 and executes steps 715 to step 745 for one or more iterations until the set of active image sample rays is empty. In a further embodiment, step 745 may treat the set of active image sample rays as empty if a depth limit or limit on the number of sample rays is exceeded.

When the set of active image sample rays is empty, step 750 combines all of the stored sample ray values according to their respective weights to determine a value of the selected image sample. Following step 750, method 700 optionally returns to step 710 to select another image sample to be evaluated.

In a further embodiment, steps 725, 730, and 750 may be deferred until after all of the image sample points and associated sample rays have been evaluated. In this embodiment, method 700 determines whether sample rays potentially intersect opaque portions of the scene using geometric tests, such as determining if a ray corresponding with a sample ray intersects an object's bounding box. Method 700 stores a list of all sample rays potentially intersecting opaque objects and their associated depth regions and weights for one or more image sample points. This list can then be provided to a renderer to perform the actual evaluation and sampling of the scene, as well as combining sample rays according to their weights. This embodiment allows the renderer to optimize and/or parallelize many portions of its operations.

As discussed above, although different image sample points may be associated with the same pixel region and lens region, they may be assigned different random positions within the pixel region and lens region. As a result, different image sample points may view the scene along different sample rays. A renderer may use ray tracing or any other light transport rendering technique to determine the optical attributes of the portions of the scene data intersecting a ray passing through the image sample point and its lens position.

Other types of renderers, such as rasterization renderers, project geometric primitives such as particles, polygons, and micropolygons on to the image plane to identify one or more geometric primitives intersecting the selected image sample point. For these types of renderers, because image sample points are often associated with different lens positions, each image sample point views the scene data from a slightly different point of view. As a result, a different projection transformation may be required to project geometric primitives on the image plane for each image sample point.

Figure 8:
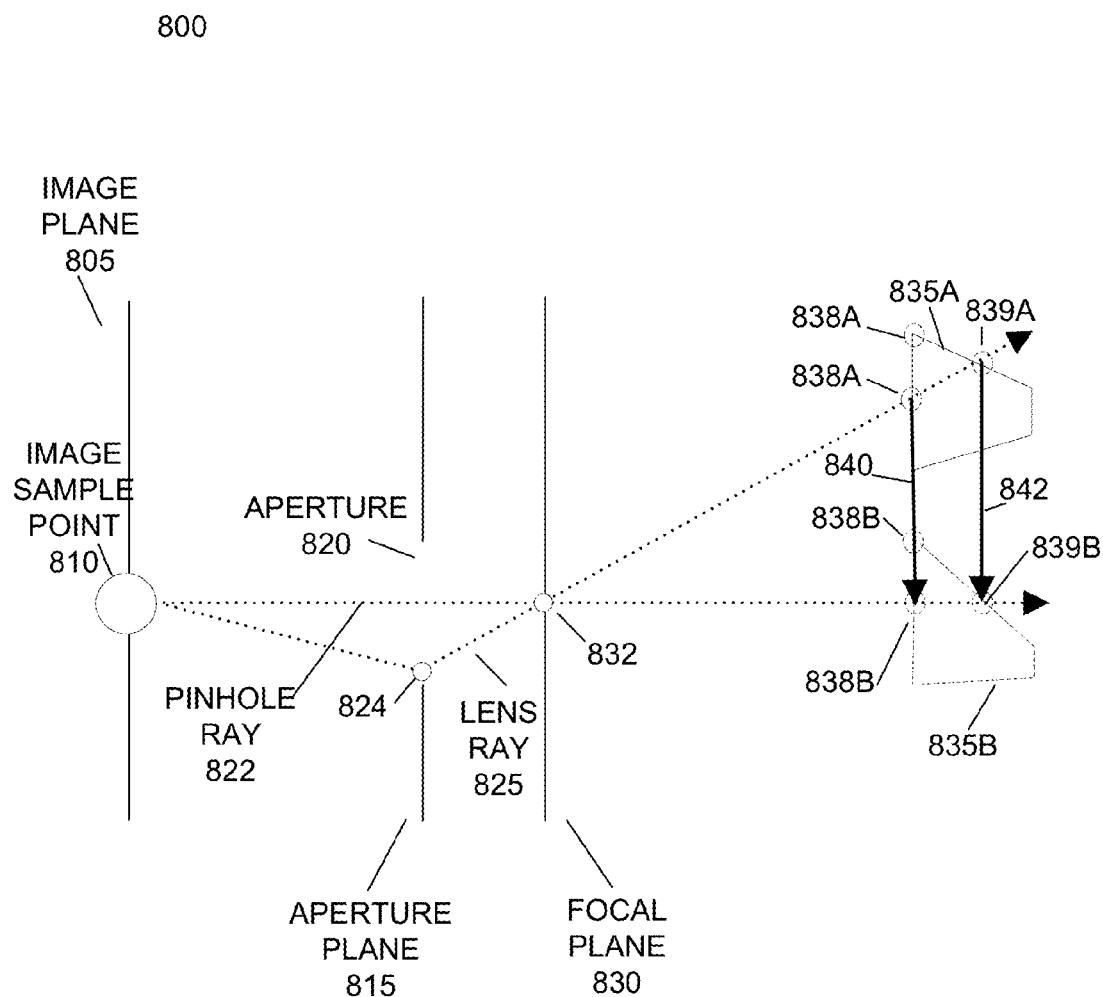
FIG. 8 illustrates an example depth of field rendering technique suitable for use with an embodiment of the invention.

As an alternative to using a different projection transformation for each image sample point, a further embodiment utilizes a depth of field rendering technique discussed in U.S. Provisional Patent Application No. 60/940,379, entitled "Shear Displacement Depth of Field, and filed May 25, 2007. FIG. 8 illustrates an example application 800 of an embodiment of the invention. Example 800 includes an image plane 805. Image plane 805 includes an image sample point 810. Example 800 also includes an aperture plane 815 with a virtual aperture 820.

If aperture 820 were a pinhole aperture, as assumed by prior renderers that could not simulate depth of field, then following a perspective transformation, the image sample 810 would view the scene along pinhole ray 822. However, because aperture 820 is larger than a pinhole aperture and the image sample 810 is associated with a lens position 824, image sample 810 views the scene along lens ray 825. Lens ray 825 originates at image sample point 810, passes through lens position 824 in the aperture plane 815 and focal point 832 in focal plane 830.

An embodiment of the invention shears the scene geometry towards the center of the aperture 820 by the distance between the pinhole ray 822 and the lens ray 825 at the depth of the geometry. For example, an unsheared object 835A includes points at positions 837A, 838A, and 839A. Each of these points will be sheared or displaced parallel to the image plane by the distance between the lens ray 825 and the pinhole ray 822 at the depth of each point. For example, at the depth of points 837A and 838A, the distance between the lens ray 825 and the pinhole ray 822 is vector 840. Thus, points 837A and 838A will be sheared by vector 840 to form sheared points 837B and 838B. Similarly, the distance between the lens ray 825 and the pinhole ray 822 at the depth of point 839A is given by vector 842. Thus, all points at this depth will be sheared by vector 842. For example, point 839A is sheared by vector 842 to form point 839B. After shearing or displacing all of the points of object 835A by an amount based on the distance between the lens ray 825 and the pinhole ray 822 at their respective depths, the sheared points form a sheared version 835B of object 835A.

In example 800, the point originally at location 838A and intersected by lens ray 825 is sheared to location 838B, where it is intersected by the pinhole ray 822. Thus, the view of the unsheared scene from image sample 810 along the lens ray 825 is the same as the view of the sheared scene along pinhole ray 822. Because these views are identical, the renderer can sample the sheared version of the scene along pinhole ray 822 to determine the image sample's 810 view of the unsheared scene along lens ray 825.

Similarly, the renderer can evaluate all of the image sample points along parallel pinhole rays, while shearing the scene differently for the image sample points to account for each image sample's assigned lens position. Because all of the image sample points sample the image along parallel rays, the renderer can apply the same projection transformation to the scene data for all of the image sample points and use conventional Z-buffering and depth compositing techniques to determine the attribute values of image sample points. It should be noted that lens ray 825 and pinhole ray 822 are intended for illustration and that the scene can be rendered using this depth of field shearing technique with any rendering technique known in the art, including non-raytracing rendering techniques such as polygon or micropolygon rasterization and scanline rendering techniques.

Figure 9:
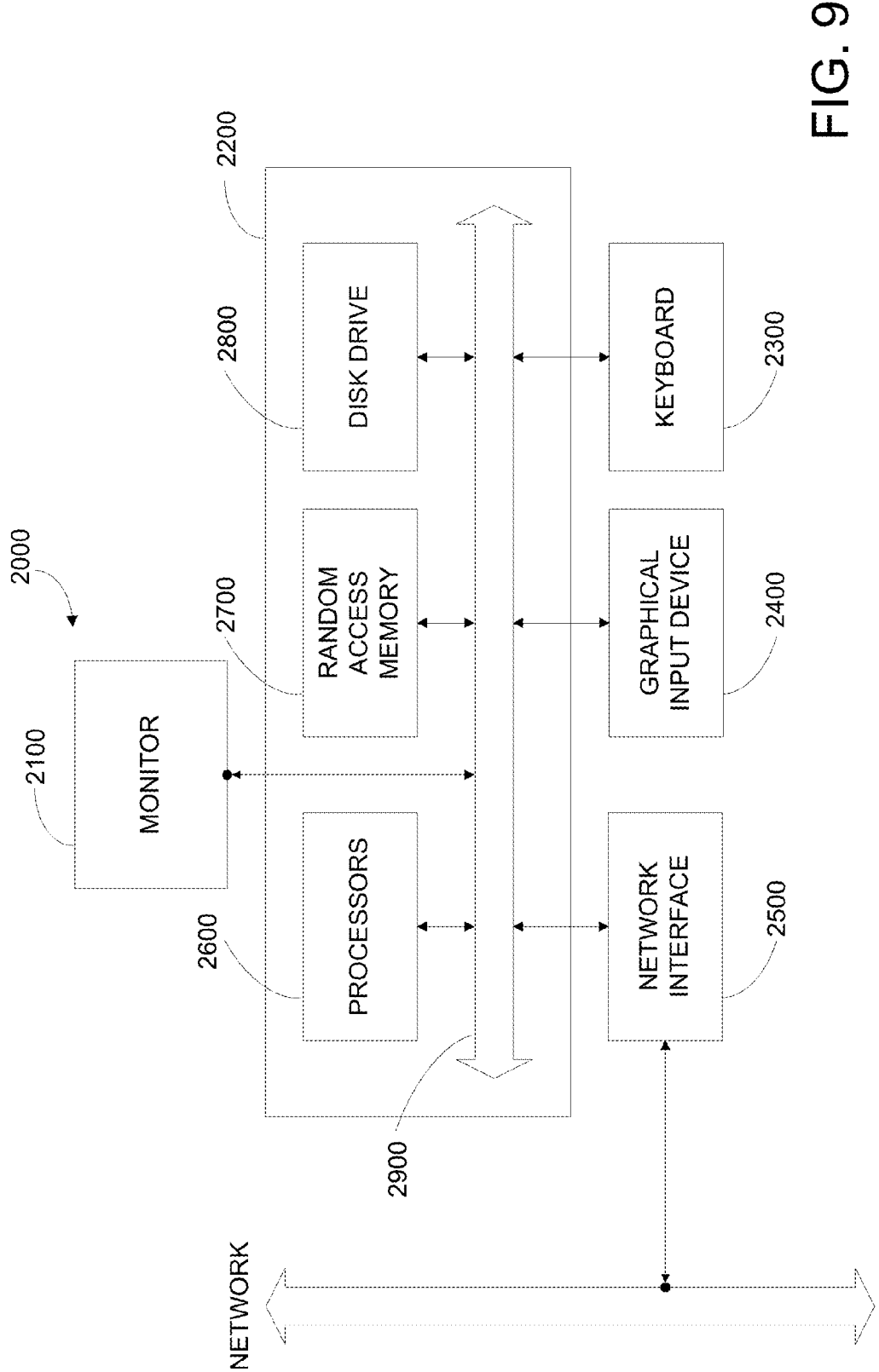
FIG. 9 illustrates a computer system suitable for implementing an embodiment of the invention.

FIG. 9 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes;

non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of generating an image from three-dimensional scene data, the method comprising:
    defining a first sampling frustum;
    associating a first depth region with the first sampling frustum;
    defining a first set of samples within the first depth region adapted to sample a scene to determine at least a first portion of an attribute value of a first image sample;
    associating a second depth region with the first sampling frustum;
    defining a second set of samples within the second depth region adapted to sample the scene to determine at least a second portion of the attribute value of the first image sample; and
    sampling the scene with at least a portion of the first set of samples and a portion of the second set of samples using a processor;
    wherein the second set of samples is larger than the first set of samples.

2. The method of claim 1, wherein the second depth region is further from the first image sample than the first depth region.

3. The method of claim 2, wherein distances of the first depth region and the second depth region are based on distances from a plane.

4. The method of claim 2, wherein distances of the first depth region and the second depth region are based on distances along at least one ray associated with the first sampling frustum.

5. The method of claim 1, wherein the first image sample includes a color value in response to at least the first and second sets of samples.

6. The method of claim 1, wherein the first image sample includes a value in response to at least the first and second sets of samples, wherein the value is selected from a group consisting of: an illumination value; a reflection value; a refraction value; and a scattering value.

7. The method of claim 1, wherein the size of the first and second sets of samples is based on a function of distance from an entity, wherein the entity is selected from a group consisting of:
    a focal plane; a camera viewpoint; an image plane, a surface point of an object; a particle; an interior point of an object; a volume; an implicit surface; and a scene element.

8. The method of claim 7, wherein the first image sample includes a color value in response to a depth of field effect from at least some of the first and second sets of samples.

9. The method of claim 1, wherein the first and second depth regions are located at regular intervals of a function of depth.

10. The method of claim 1, wherein the size of the first and second sets of samples is proportional to the volumes of their associated depth regions.

11. The method of claim 1, wherein the first set of samples are distributed within the first depth region according to a Halton sequence.

12. The method of claim 1, wherein the first set of samples are randomly or pseudo-randomly distributed within the first depth region.

13. The method of claim 1, wherein the first set of samples are distributed deterministically within the first depth region.

14. The method of claim 1, wherein the second set of samples within the second depth region is defined in response to a determination that the first set of samples is not occluded by the scene in the first depth region.

15. The method of claim 1, wherein the first set of samples is associated with at least one sampling ray adapted to intersect at least a portion of the scene to determine the first portion of the attribute value of the first image sample.

16. The method of claim 1, wherein the first set of samples is adapted to sample a rasterized portion of the scene to determine the first portion of the attribute value of the first image sample.

17. The method of claim 1, wherein the second depth region is further from a sample origin than the first depth region, and wherein sampling the scene with at least a portion of the first set of samples and a portion of the second set of samples using a processor comprises:
    determining if at least a first sample in the portion of the second set of samples intersects a first scene element in the second depth region;
    in response to the determination that the first sample intersects the first scene element in the second depth regions, back-tracing the first sample towards the sample origin at least through the first depth region;
    determining if the back-tracing sample intersects a closer scene element in the first depth region; and
    in response to the determination that the back-tracing sample intersects the closer scene element in the first depth region, excluding an attribute value of the first scene element from the attribute value of the first image sample.

18. The method of claim 17, wherein the first sample in the portion of the second set of samples does not correspond with any of the first set of samples.

19. A non-transitory computer-readable medium including instructions adapted to direct a computer to perform an operation, the operation comprising:
    defining an image plane;
    defining a focal plane;
    defining a first sampling frustum on a first side of the focal plane between the focal plane and the image plane;
    defining a second sampling frustum on a second side of the focal plane, wherein the second side is opposite to the first side
    associating at least a first depth region and a second depth region with the first sampling frustum;
    associating at least a third depth region and a fourth depth region with the second sampling frustum;
    defining a first set of samples associated the first depth region, a second set of samples associated the second depth region, a third set of samples associated the third depth region, and a fourth set of samples associated the fourth depth region, wherein the first, second, third, and fourth sets of samples are adapted to sample a scene to determine at least a first portion of an attribute value of a first image sample; and wherein sizes of the first, second, third, and fourth sets of samples increases in proportion to distances of their respective associated depth regions from the focal plane.

20. The non-transitory computer-readable medium of claim 19, wherein the distances of the depth regions to the focal plane are based on distances from the focal plane.

21. The non-transitory computer-readable medium of claim 19, wherein distances of the depth regions to the focal plane are based on distances along at least one ray associated with the first and second sampling frustums.

22. The non-transitory computer-readable medium of claim 19, wherein sizes of the first, second, third, and fourth sets of samples increases monotonically as a function of a distance from the focal plane.

23. The non-transitory computer-readable medium of claim 19, wherein:

second depth region and the third depth region are adjacent to the focal plane; and the size of the second set of samples is different than the size of the third set of samples.

24. The non-transitory computer-readable medium of claim 19, wherein the first image sample includes a color value in response to at least one of the first, second, third, and fourth sets of samples.

25. The non-transitory computer-readable medium of claim 19, wherein the first, second, third, and fourth depth regions are located at regular intervals of a function of depth.

26. The non-transitory computer-readable medium of claim 19, wherein the sizes of the first, second, third, and fourth sets of samples are proportional to the volumes of their associated depth regions.

27. The non-transitory computer-readable medium of claim 19, wherein the first set of samples is distributed within the first depth region according to a Halton sequence.

28. The non-transitory computer-readable medium of claim 19, wherein the first set of samples is randomly or pseudo-randomly distributed within the first depth region.

29. The non-transitory computer-readable medium of claim 19, wherein the first set of samples is distributed deterministically within the first depth region.

30. The non-transitory computer-readable medium of claim 19, wherein the second, third, and fourth sets of samples within their respective associated depth regions are defined in response to a determination that the first set of samples is not occluded by the scene in the first depth region.

31. The non-transitory computer-readable medium of claim 19, wherein the first set of samples is associated with at least one sampling ray adapted to intersect at least a portion of the scene to determine the first portion of the attribute value of the first image sample.

32. The non-transitory computer-readable medium of claim 19, wherein the first set of samples is adapted to sample a rasterized portion of the scene to determine the first portion of the attribute value of the first image sample.

* * * * *